United States Patent

Erbora et al.

[11] Patent Number: 5,319,800
[45] Date of Patent: Jun. 7, 1994

[54] SWITCHED CAPACITOR LOAD COMPENSATOR

[75] Inventors: Yusuf L. Erbora; Branko L. Avanic, both of Miami, Fla.

[73] Assignee: Motorola, Inc., Schaumburg, Ill.

[21] Appl. No.: 787,341

[22] Filed: Nov. 4, 1991

[51] Int. Cl.$^5$ .............................................. H04B 1/44
[52] U.S. Cl. ........................................ 455/78; 455/83; 455/262
[58] Field of Search ............ 455/75, 76, 78, 80, 455/84, 85, 86, 87, 262, 264, 83; 307/116, 39, 30; 331/74

[56] References Cited

U.S. PATENT DOCUMENTS

| | | | |
|---|---|---|---|
| 3,153,194 | 10/1964 | Orwin et al. | 455/87 |
| 4,885,799 | 12/1989 | Van Horn | 455/78 |
| 5,140,223 | 8/1992 | Gesche et al. | 331/74 |
| 5,166,857 | 11/1992 | Avanic et al. | 455/78 |

Primary Examiner—Reinhard J. Eisenzopf
Assistant Examiner—Nguyen Vo
Attorney, Agent, or Firm—Michael J. Buchenhorner; M. Mansour Ghomeshi

[57] ABSTRACT

In a radio transceiver (11) including a voltage controlled oscillator (VCO) (24) having an output for coupling to a switchable load (32, 30), a switch (42) couples a compensating load (44) to the output of the VCO when the switchable load is in an off state. The compensating load has an impedance that compensates for the decoupling of the load impedance from the output of the VCO, thus avoiding frequency pull problems. In a further aspect of the invention a voltage variable capacitor (100) is used as the switch.

6 Claims, 4 Drawing Sheets

SWITCHED CAPACITOR LOAD COMPENSATOR

TECHNICAL FIELD

This invention relates generally to radio communications electronics and more specifically to radio communications electronics devices in which switching between receive and transmit modes is required.

BACKGROUND

In a communication system where switching between the receive and transmit modes is needed, it is very common to encounter frequency pull problems. This problem is more prevalent in Time Division Duplex (TDD) systems where switching between receive and transmit is in the order of milliseconds.

Frequency pull is a phenomenon associated with the Voltage Controlled Oscillator (VCO) where due to impedance variations presented at the output of the oscillator, the oscillation frequency of the VCO will momentarily change frequency, thus potentially adversely affecting the communication link.

Referring to FIG. 1 there is shown a conventional radio circuit 10 in which the frequency pull problem is illustrated. The radio 10 is a time-division multiplexed radio. The radio is in the receive mode for one millisecond and in the transmit mode for one millisecond. In the receive mode, the radio circuit 10 receives radio frequency (RF) signals with an antenna, which is coupled to the receiver and transmitter portions of the radio 10 through an antenna switch 12. A first intermediate frequency (IF) section converts the received RF signals to first IF signals. A receiver down mixer 16 multiplies the first IF signals with a second injection signal provided at a second local oscillator (VCO) 24 to produce second IF signals. A second IF section 18 demodulates the second IF signals and a receiver audio section processes the demodulated signals and applies the resulting signals to a speaker 22.

In the transmit mode, controller 28 turns on the mixer 32 and the power amplifier 30, and a microphone 38 provides audio signals to a transmitter section 36. The transmitter up-mixer 32 multiplies the output of the transmitter section 36 with an injection signal (provided by the VCO 24) to provide an RF signal. A power amplifier 30 amplifies the output of the transmitter up-mixer 32 for transmission by the antenna. Since during the receive mode the transmitter up-mixer 32 is off, it presents a relatively high impedance to the VCO 24. When the radio 10 returns to the transmit mode, the controller 28 turns the transmitter up-mixer 32 back on and it exhibits an impedance of approximately 50 Ohms (i.e., a relatively low impedance). This change in impedance creates a frequency pull problem for the VCO 24. For example, at time "a" (the instant of switching to the receive mode), the VCO 24 frequency changes from its nominal frequency, and takes about a substantial period of the receive or transmit cycle to return to its original frequency. Similarly, the frequency of VCO 34 changes, at time "b" (as shown in the bottom waveform), when the radio switches back to the transmit mode. The impedance variation that causes this frequency change is attributed to the turning on and off of the mixer 32 and the power amplifier 30.

The most common way of solving the problem is by designing buffer stages (one or more), such as buffer 26, in between the oscillator 24 and the switched device(s) (mixer 32 and amplifier 30, in this case). The buffering is used to provide isolation and the changes in impedance are drastically reduced at the output of the oscillator. The buffer solution, however, presents the following disadvantages:

Higher current is needed during standby operation of the radio (i.e., during receive);

Depending on the isolation needed, several stages of buffers might be needed;

The parts count is higher;

Circuit board surface area needed is higher.

Thus, a need exists for a solution to the frequency pull problem that avoids the above disadvantages.

SUMMARY OF THE INVENTION

Briefly, according to the invention, a voltage controlled oscillator (VCO) circuit has an output for coupling to a switchable load. The switchable load has an on state and and off state, and a first impedance when in the on state, and a second impedance when in the off state. The VCO circuit comprises a compensating load, having a compensating impedance, for coupling to the output of the VCO and switch means for coupling the compensating load to the output of the VCO when the switchable load is in the off state. The value of the compensating impedance is selected to compensate for the off impedance when the switchable load is in the off state.

DETAILED DESCRIPTION OF THE PREFERRED EMBODIMENT

Figure 1:
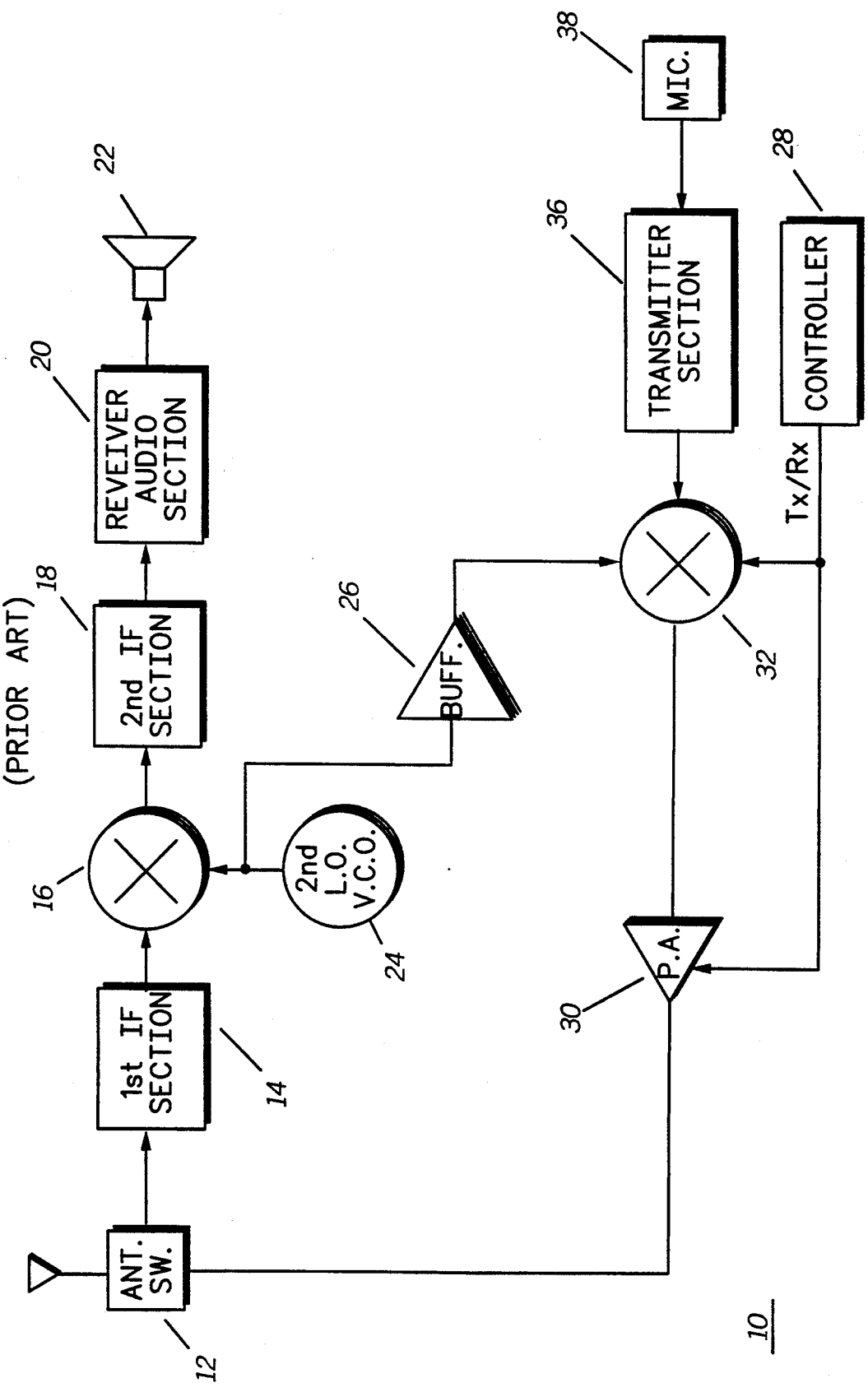
FIG. 1 is a simplified block diagram of a conventional radio transceiver.
Figure 2:
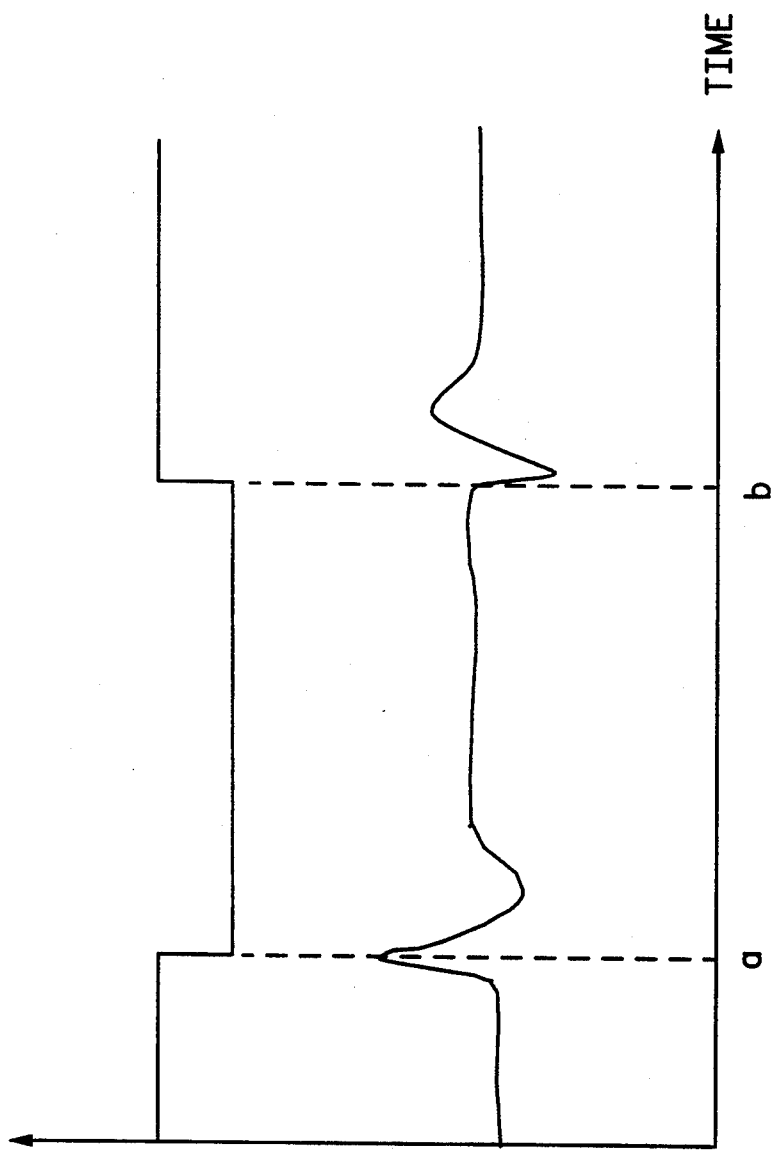
FIG. 2 is a plot of the transmit/receiver switching signal and the frequency of a voltage-controlled oscillator.
Figure 3:
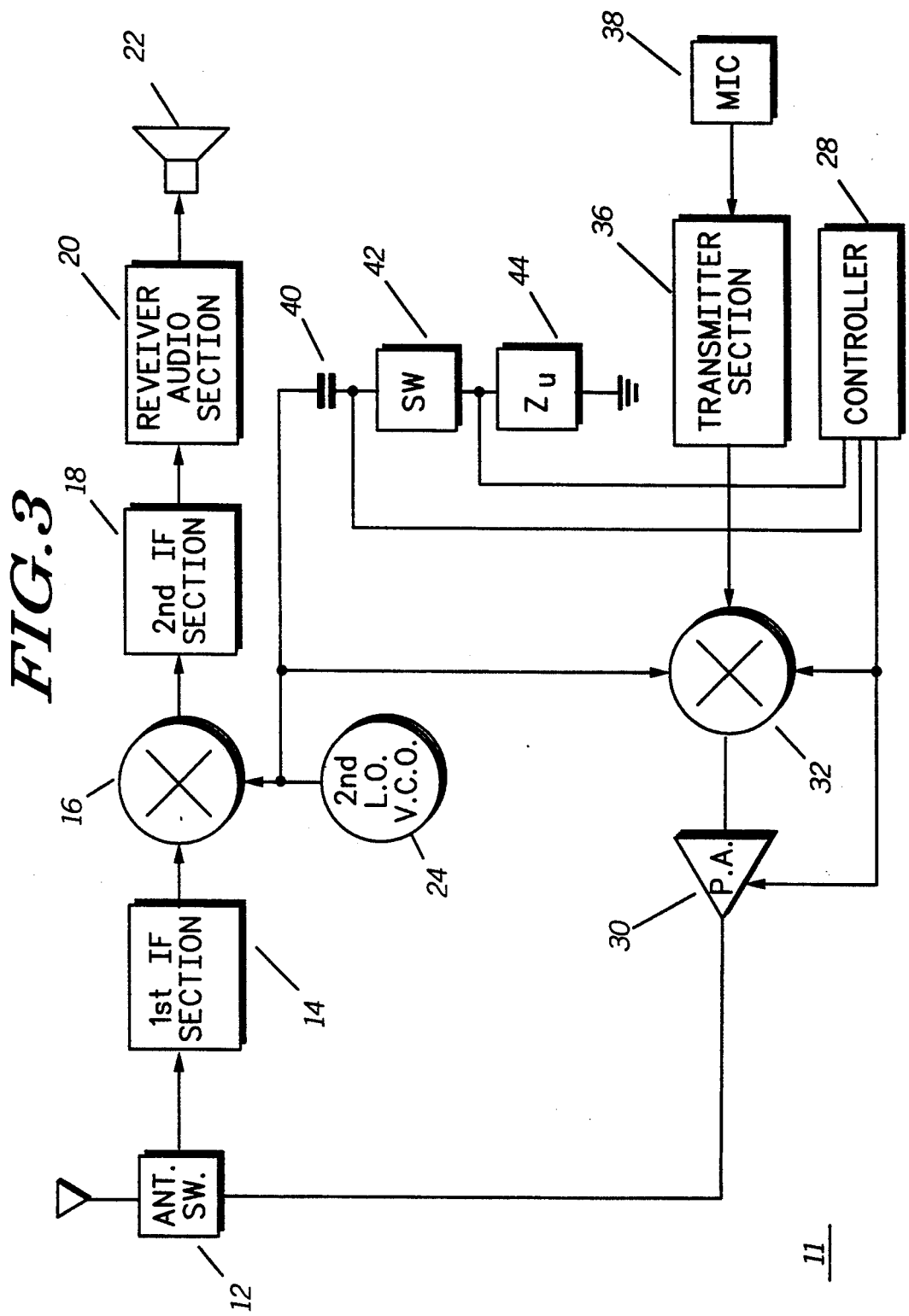
FIG. 3 is a simplified block diagram of a radio transceiver having switched capacitor load compensation in accordance with the invention.

Referring to FIG. 3, there is shown a simplified block diagram of the radio transceiver 11 having switched load compensation in accordance with the invention. The radio transceiver 11 is the same as radio transceiver 10 (shown in FIG. 1) except that the buffer 26 has been eliminated and a branch, comprising a capacitor 40, a switch 42 and a load having compensating impedance ($Z_u$) 44, has been connected in parallel to the the VCO 24, in accordance with the invention. The switch 42 is controlled by controller 28 so that when the transceiver 11 switches from transmit (mixer 32 on) to receive (mixer 16 on), the switch 42 couples the load 44 to the VCO 24 (via capacitor 40). Also, the controller 28 turns the mixer 32 ON or OFF via the transmitter/receiver line in the transmit or receive mode, respectively. The value of the load is selected so that the VCO 24 does not see much change in impedance as the mixer 32 is turned off. Thus, the cause (variations in impedance) of the frequency pull problem, and, hence, the need for buffering are eliminated.

The switch 42 can be implemented by using a voltage variable capacitor (VVC). A VVC is a device which exhibits a very large variation in capacitance vs. voltage. Capacitance variation in the order of 50 to 1 can be exhibited from the ON state (+2 V) to the OFF state (−2 V). For a given frequency and given capacitance this change is equivalent to a short circuit to open circuit transition. Due to the physical construction of the VVC, this electrical property is obtained with no appreciable current drain penalty, the currents present are only leakage currents which are in the order of nano-amperes.

The dimension of the VVC is proportional to the capacitance in the OFF state; a typical size for a 50 pico-Farad capacitance is 10×10 mils. This device can be used as a discrete device or integrated as part of a much larger subcircuit (i.e. integrated mixer, etc.).

The frequency pull phenomenon is directly attributable to impedance variations at the output of the VCO. This impedance variation from the ON state (Zon) to the OFF state (Zoff) can be easily characterized. The VVC in series with an impedance Zu is placed in parallel at the output of the oscillator. The impedance Zu in combination with the ON capacitance of the VVC is selected such that in parallel with the OFF impedance of the switched device Zoff it presents the same impedance as if the device was on Zon. It should be noted that Zon is generally 50 Ohms while Zoff is a much larger impedance, That is, $$[Z_{OFF}//Z_U] = Z_{ON} \text{ or}$$

$$Z_U = \frac{Z_{ON} Z_{OFF}}{Z_{OFF} - Z_{ON}}$$

Simply, the impedance variation from ON to OFF is made to look approximately the same as if the device was ON all the time. Therefore, with minimal load changes, the frequency pull problem will be eliminated.

A VVC is a semiconductor device characterized by voltage sensitive capacitance which resides in the space-charge region at the surface of a semiconductor bounded by an insulating layer. As compared to VVCs, varactors are very limited in their dynamic range.

Figure 4:
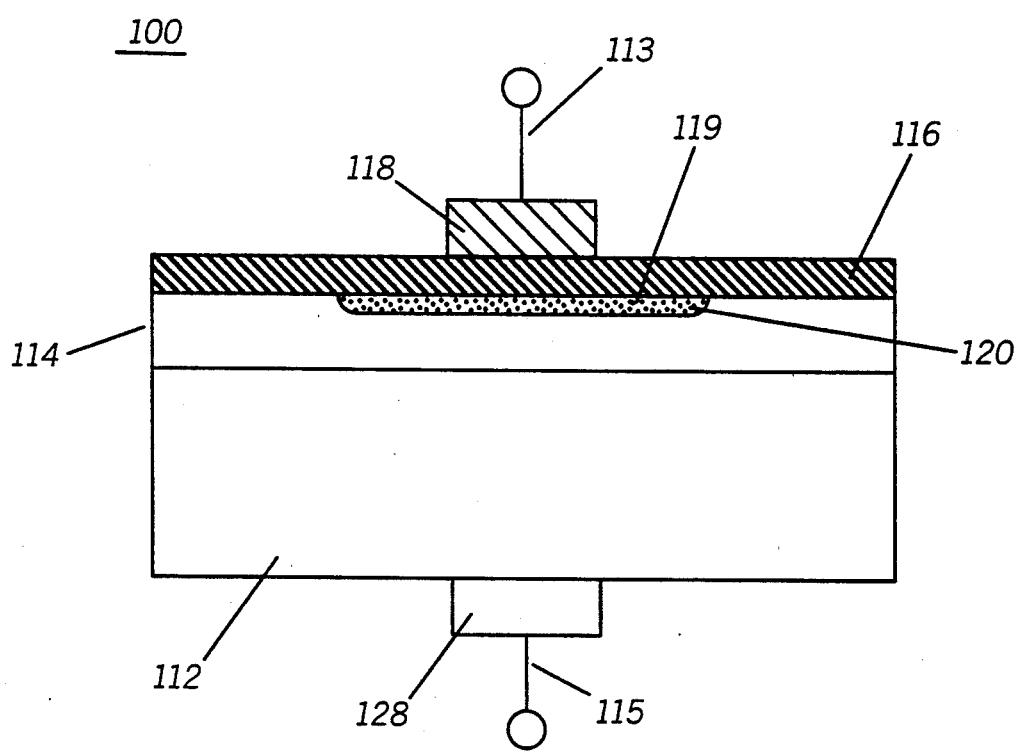
FIG. 4 is a cross section of a voltage variable capacitor for use in accordance with the invention.

Referring now to FIG. 4, there is shown a cross-sectional view of an electronically tunable-distributed capacitive network 100, in accordance with the principles of the present invention. The network 100 may be tuned via a voltage applied to two control lines 113 and 115. The capacitive network 100 is formed on a semiconductor substrate 112 having a surface layer 114 being less heavily doped. The surface layer 114, which is less heavily doped, has a higher resistivity than the semiconductor and serves as an area for the depletion layer to form. An insulator layer 116 is applied over the surface layer 114. At least one metal plate 118 is formed on the insulator layer 116. The metal plate 118 provides the external contact to the reactance component of the network 100 via a contact pin 113. More metal plates along with contacts may be formed on the insulator layer 116 to provide further control over the distributed capacitance of the network 100.

The insulator layer 116 is preferably zirconium titanate (ZrTiO₄) applied in a thickness from 300 Ångstroms to 1000 Ångstroms, but thicknesses from 100 Ångstroms to 2 microns have been found to be suitable. The material employed as the dielectric or insulating layer should have a dielectric constant much greater than that of the semiconductor. Examples of suitable materials that may be used for this purpose are to be found in Table 1 below:

TABLE 1

| | |
|---|---|
| tantalum pentoxide | $Ta_2O_5$ |
| niobium pentoxide | $Nb_2O_5$ |
| zirconium oxide | $ZrO_2$ |
| titanium dioxide | $TiO_2$ |
| zirconium titanate | $ZrTiO_4$ |
| strontium titanate | $SrTiO_3$ |
| barium titanate | $BaTiO_3$ |
| lead titanate | $PbTiO_3$ |
| barium tetratitanate | $Ba_2Ti_9O_{20}$ |
| barium neodymium titanate | $BaNd_2Ti_5O_{14}$ |
| lead-zirconium titanate | $Pb(Zr,Ti)O_3$ |
| lead-lanthanum zirconium titanate | $(Pb,La)(Zr,Ti)O_3$ |
| lithium niobate | $LiNbO_3$ |
| strontium-baruim niobate | $(Sr,Ba)Nb_2O_6$ |

Oxides of additional elements such as molybdenum, tungsten and vanadium may also be expected to be useful, either alone or in combination with other elements.

When an appropriate reverse bias is applied to the metal electrode 118, mobile minority charge carriers are attracted to a semiconductor insulator interface 119, forming a space-charge or depletion layer 120, which extends for some distance into the semiconductor 114. This depletion layer behaves as a variable width capacitor which is electrically in series with the capacitor formed by the insulator layer 116. These two series capacitor serve to create a net capacitance effect that is affected by the changes of each individual capacitor. The electrode bias voltage controls the width of the depletion layer from zero at the accumulation threshold to a maximum thickness at the inversion threshold and thereby varies the total capacitance of the device. The insulator layer 116 serves to provide the spacing between the top electrode 118 and the depletion layer 120. The depletion layer 120 is a transient layer formed when the bias voltage is applied to the capacitor through input contacts 113 and 115. The depletion layer 120, hence the distributed capacitance, may be reduced or disappear when the applied voltage field is varied or removed. Although shown in the drawing as a distinct feature, the depletion layer 120 should not be regarded as a permanent mechanical feature of the network 100. The operation theory described herein is similar to that found in operation of metal-oxide-semiconductor capacitors.

At the inversion threshold voltage, enough charge carriers have been attracted to the semiconductor interface such that an inversion layer is formed. Increasing the voltage bias increases the width of the inversion layer, until the layer reaches a maximum width, beyond which the depletion layer cannot be substantially increased by increasing electrode bias voltage. The maximum depletion width is determined by the concentration of the impurity dopant near the semiconductor surface onto which the insulator layer 116 has been deposited. Dopants such as phosphorous, antimony, boron and arsenic will be recognized by those skilled in the art to be useful with silicon substrates. Other semiconductor substrates, such as gallium arsenide, may also be utilized to form a VVC in accordance with the invention.

The lower the doping, the larger the maximum depletion layer thickness, and thus, the lower minimum capacitance which can be achieved. The thickness of a less heavily doped surface layer may be chosen to be equal to or slightly greater than this maximum depletion width in order to minimize the series resistance of the device while maximizing the capacitance change.

Formation of an improved voltage tunable capacitive network is highly dependent upon the choice of the material comprising the insulator layer 116. By choosing a material with a much larger relative dielectric constant than the semiconductor depletion layer 120, a larger ratio of maximum-to-minimum distributed capacitance will be obtained. The larger the insulator's dielectric constant, the larger the capacitance ratio in capacitance per unit area will be for a given insulator thickness.

Many materials with very high dielectric constants have ferroelectric properties which are not desirable for high frequency devices. The polarization for a ferroelectric material has a hysteresis loop, or memory, whereby a residue polarization remains after an applied bias voltage has been removed. Thus, a residual depletion layer would also remain and thereby limit the capacitance ratio which may be obtained. These materials would be best utilized in lower frequency applications.

A low-loss, non-ferroelectric insulator layer is required for high frequency applications, specifically those for use in radio transmitting and receiving. Zirconium Titanate ($ZrTiO_4$) is one suitable non-ferroelectric material with a high relative dielectric constant ($K_r$ is approximately equal to 40) and low dielectric loss. By comparison, the relative dielectric constant of silicon dioxide (used in conventional MOS capacitors) is 3.9. The dielectric constant of the depletion layer in silicon is 11.7 and the dielectric constant of the depletion layer in germanium is 15.7. It can be easily seen that the dielectric constant of the zirconium titanate and the aforementioned materials in Table 1 is much larger than that of silicon dioxide, therefore an improved capacitor having higher capacitance ratio can be fabricated. Thin films of zirconium titanate can be formed by any of several techniques, including but not necessarily limited to, sputtering, evaporation, chemical vapor deposition, ion beam or plasma enhanced processes, sol-gel, and other solution chemistry processes.

By choosing an insulator with a much larger relative dielectric constant than a semiconductor depletion layer, a larger ratio between the maximum capacitance at zero depletion layer thickness and the minimum capacitance at the inversion threshold can be achieved. This strategy has been largely overlooked because the theory of MOS capacitors was developed with a silicon dioxide insulator on silicon. Because the maximum width of the depletion layer in an MOS capacitor is limited by the formation of an inversion layer, the capacitance change which can be achieved with a low dielectric constant material, such as silicon dioxide, is less than or comparable to what can be achieved by varying the depletion width around a PN junction.

Accordingly, the use of a VVC as a switching element in a transceiver having a VCO eliminates the frequency pull problem associated with a variable load on the VCO by compensating for those variations. Therefore, the need for buffering is eliminated.

What is claimed is:

1. A voltage controlled oscillator (VCO) circuit having an output for coupling to a switchable load, the switchable load having an ON state and an OFF state, and a first impedance when in the ON state, and a second impedance when in the OFF state, the VCO circuit comprising:
   a compensation load, having a compensating impedance, for coupling to the output of the VCO;
   a voltage variable capacitor (VVC) for coupling the compensation load to the output of the VCO when the switchable load is in the OFF state and decoupling the compensation load from the output of the VCO when the switchable load is in the ON state,
   wherein the VVC includes a VVC impedance, coupled in parallel with the VCO, and the value of the compensating impedance is selected so that the compensating impedance in combination with the VVC impedance in parallel with the second impedance presents the same impedance as the first impedance; and
   the value of the compensating impedance being selected to compensate for the second impedance when the switchable load is in the OFF state.

2. The VCO circuit of claim 1 further comprising a capacitor disposed between the output of the VCO and the VVC.

3. A radio transceiver comprising;
   a voltage controlled oscillator (VCO) having an output;
   a switchable load, for coupling to the output of the VCO, the switchable load having an ON state and an OFF state, and a first impedance when in the ON state, and a second impedance when in the OFF state;
   a compensating load, having a compensating impedance, for coupling to the output of the VCO;
   a voltage variable capacitor (VVC) for coupling the compensating load to the output of the VCO when the switchable load is in the OFF state and decoupling the compensating load from the output of the VCO when the switchable load is in the ON state,
   the VVC includes a VVC impedance, coupled in parallel with the VCO, and the value of the compensating impedance is selected so that the compensating impedance in combination with the VVC impedance in parallel with the second impedance presents the same impedance as the first impedance; and
   the value of the compensating impedance being selected to compensate for the second impedance when the switchable load is in the OFF state.

4. The radio transceiver of claim 3, operates in a time division multiplex manner and further comprises a receive mode and a transmit mode.

5. The radio transceiver of claim 3 further comprising a capacitor disposed between the output of the VCO and the VVC.

6. The radio transceiver of claim 3 further comprising a controller for controlling the operation of the radio transceiver.

* * * * *